Figure 1:
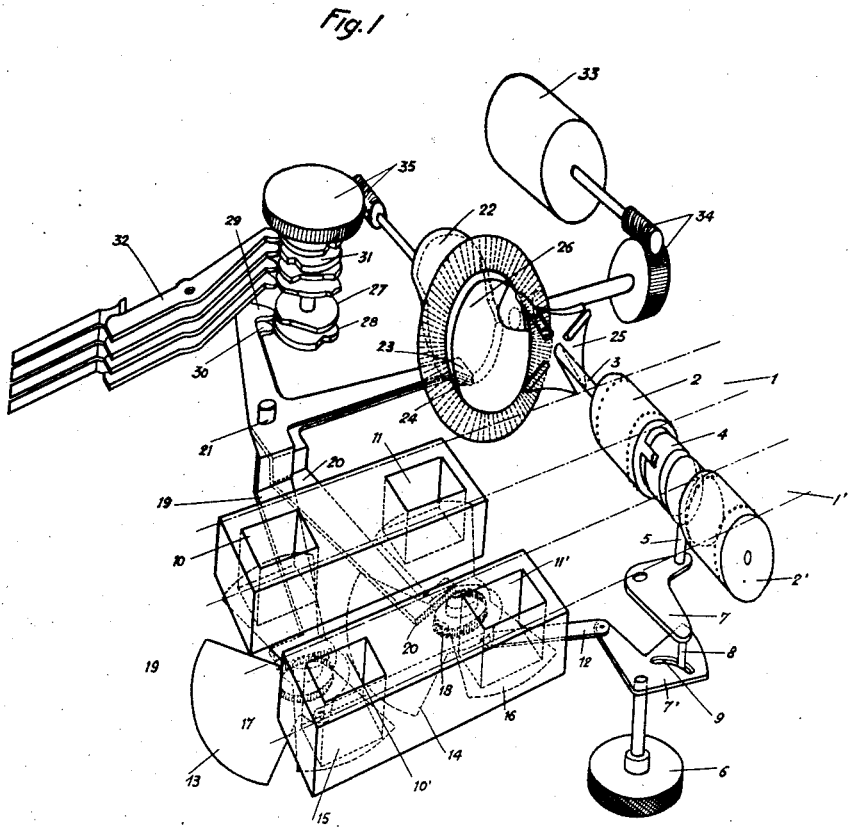

Jan. 11, 1949.  A. V. L. C. DEBRIE  2,458,769
APPARATUS FOR THE PHOTOGRAPHIC
REPRODUCTION OF DOCUMENTS
Filed Aug. 31, 1945  5 Sheets-Sheet 1

Jan. 11, 1949.  A. V. L. C. DEBRIE  2,458,769
APPARATUS FOR THE PHOTOGRAPHIC
REPRODUCTION OF DOCUMENTS
Filed Aug. 31, 1945  5 Sheets-Sheet 3

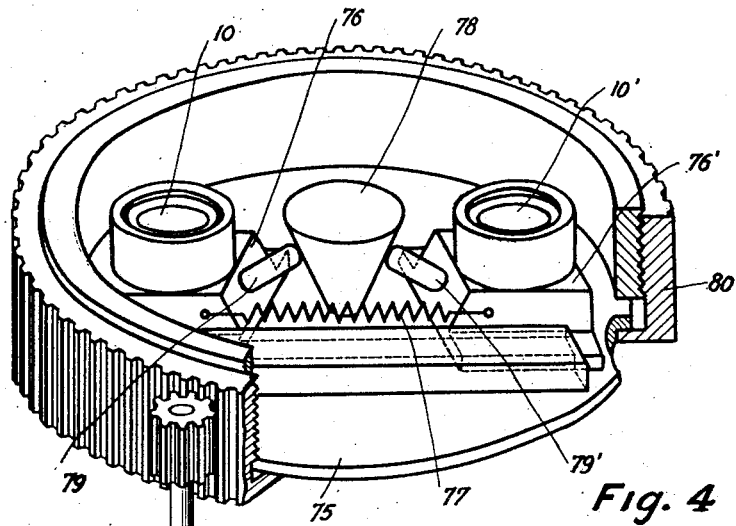
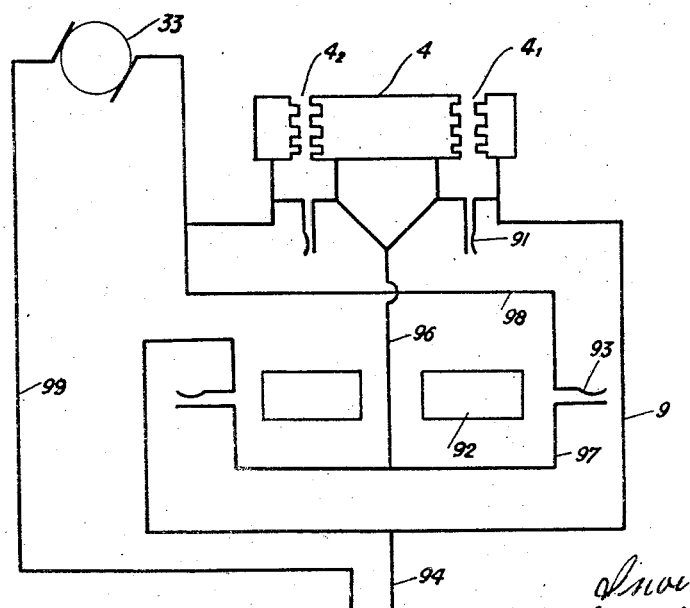

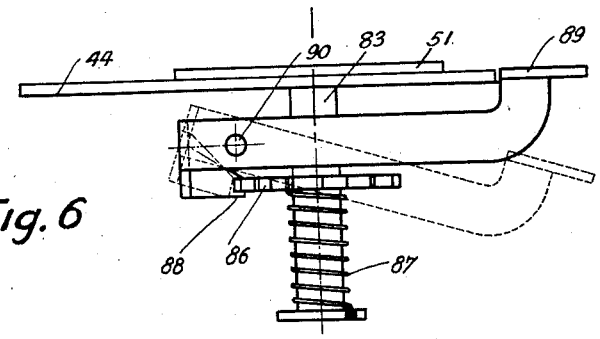
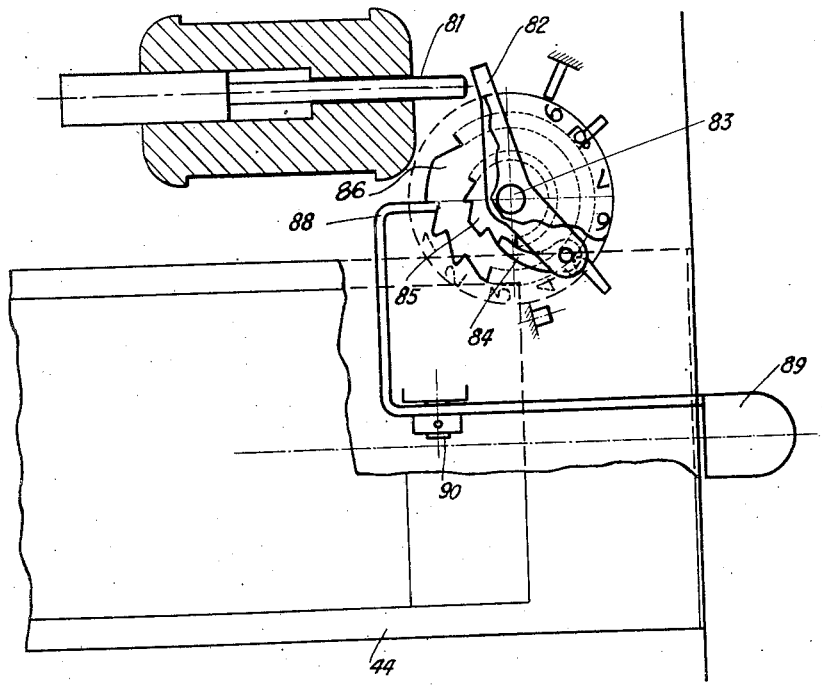

Patented Jan. 11, 1949

2,458,769

UNITED STATES PATENT OFFICE 2,458,769

APPARATUS FOR THE PHOTOGRAPHIC REPRODUCTION OF DOCUMENTS

André Victor Léon Clément Debrie, Paris, France

Application August 31, 1945, Serial No. 613,938
In France January 20, 1945

4 Claims. (Cl. 88—24)

It is known to photographically reproduce documents on cinematographic films of standard or special size, the images being taken in succession or grouped in order to constitute indexing means (index-films).

The object of the present invention is an apparatus for the reproduction on a cinematographic film of documents in sequence by image groups separated by a title forming image, the latter containing, if desired, in addition to the title proper, a classification number, the reduction ratio or any other information, the various groups being of the same length and constituting an index-film. This result is achieved by means of a plurality of appropriate cams, suitably arranged, which control at the required moments, the opening and closing of shutters masking or unmasking the image objective and the title objective. These cams may be moved in such a manner as to allow the constitution of groups composed of any number of images separated by a title, the title image even being done away with, if desired.

According to a preferred embodiment, the apparatus is so designed as to allow the simultaneous reproduction of the same document on two films moving parallel to one another and each having their supply and take up magazines and their own objectives. However, by means of a disengaging or uncoupling device, it is possible, if desired, to make use of either one of said films, said disengaging device actuating at the same time a shutter for closing the objective of the film which is not used.

The apparatus is mounted on a carriage sliding on a frame above the support for the document to be photographed and carrying a desk for receiving an index card on which are inscribed the title as well as any other information which it is desired to see reproduced on the index film.

The starting and the stopping of the apparatus are effected for each photographing operation by means of a single actuation of a lever or of a knob which automatically produces all the movements for the photographing of the images, of titles, for the feeding of the films, etc.

The two objectives intended for photographing simultaneously the documents on the two films are simultaneously focused from a distance. This focusing is automatically accompanied by a correction of the distance between the said two objectives according to the reduction ratio and consequently according to the distance from these objectives to the document to be photographed, in order that the optical centre of the objective is always situated on the line centre of document centre of image.

The take up magazines are locked on the apparatus. In order to unlock each magazine, it is necessary to act on a lever which automatically cuts the film by means of a rotary knife which at the same time produces a light seal so that the magazines may be detached from the apparatus in broad daylight. By means of a suitable electric device, starting of the apparatus is impossible if the magazines are not in place or if the take up magazines are empty; they are nevertheless so arranged that, when operating with one film, the apparatus may operate in spite of the absence, in the magazines, of the film which is not being used.

The desk integral with the sliding carriage comprises a counting device which automatically numbers each index card; this counter may be arranged in such a manner as to be photographed either at the head or at the tail of the index film. An additional counter numbers each index card of a series having the same title, said counter automatically returning to zero position when a change of title occurs.

Moreover, when the documents are reproduced by groups of the same length constituting an index film, a luminous signal shows the instant when the index film is completed so as to allow, if need be, the title to be changed.

Lastly, the apparatus is, to advantage, provided with various other safety or auxiliary devices which will be apparent from the detailed description about to be given.

Figure 2:
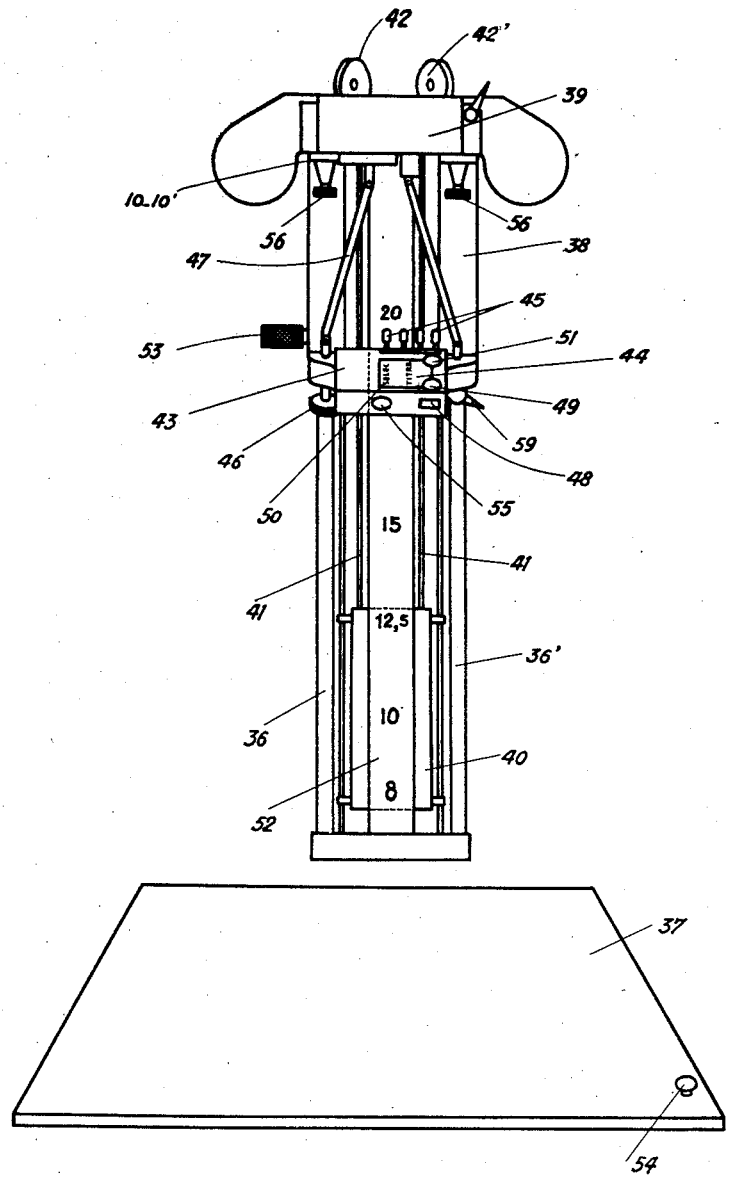
Figure 3:
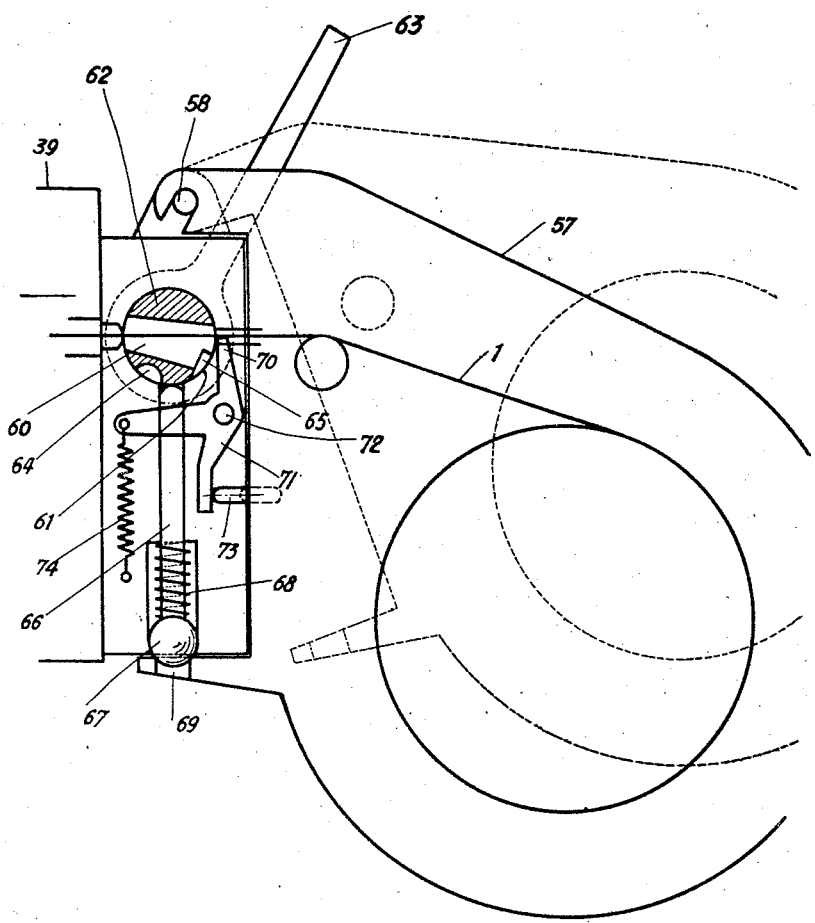

A form of embodiment of an apparatus according to the invention, enabling document to be simultaneously reproduced on two films, is shown by way of example in the accompanying drawings, in which:

Figure 1 is a diagrammatical perspective view of the photograph-taking mechanism, Figure 2 is a view in elevation of the apparatus as a whole, Figure 3 shows, in elevation, with parts in section, details of a magazine box with a film cutting and film-passage closing device, Figure 4 is a perspective view, with parts broken away, showing the device for correcting the distance between the objectives, Figure 5 is a diagrammatical view of the electric device which prevents the apparatus from starting to operate when the supply magazines are not in place on the apparatus, Figures 6 and 7 show respectively in elevation and in plan the zero re-setting device of the partial counting mechanism and the device for holding the title index card stationary.

The two films 1 and 1' are driven parallel to each other by means of toothed drums 2 and 2' mounted on a common shaft 3. A coupling device 4 enables either both drums to be simultaneously driven or, at will, either the drum 2 alone or the drum 2' alone, according as it is desired to photograph the document on both films 1 and 1' at the same time or, on either of them only, at will. The coupling device 4 is actuated by the finger 5 controlled by the milled knob 6 through the medium of the two bent levers 7 and 7' oppositely mounted relatively to one another and connected by a finger 8, carried by the lever 7 and engaging a circular groove 9 in the lever 7'.

The images of the documents are recorded on the films 1 and 1' on the passage of said films in front of the housings 10 and 10' containing the image objectives and the housings 11 and 11' containing the title objectives. By means of the rod 12, the levers 7 and 7' control the shutters 13 and 14 which mask those objectives 10-11, 10'-11' which should remain non-operative when only one film is being used.

The objectives in use are shut and opened at the required instants by the double shutters of circular shape, 15 for the image objectives 10 and 10', and 16 for the title objectives 11 and 11'. These shutters are integral with toothed rims 17 and 18 with which mesh semi-circular rack levers 19 and 20, pivoted at 21 and actuated by a cam 22 on which bear the fingers 23 and 24. This cam 22 is so arranged as to uncover the various objectives each time the film has been fed through the distance of one image under the action of the Maltese cross 25 mounted on the shaft 3 and the disc 26 of which is integral with the cam 22. However, this rate of opening must be corrected since for the constitution of the index films, it is necessary that the two objectives concerning each of the films should not be covered simultaneously; the title objective must only be open for every group of images and at that time, the image objective must be shut. On the other hand, for mechanical or constructional reasons, it may be necessary to modify the rate of operation of the image objective. These corrections are effected by a set of cams 27 and 28 on which act the fingers 29 and 30 integral with the levers 19 and 20 which may thus be maintained raised, thus retaining the shutters 15 and 16 in a stationary position. The axis of the cams 27 and 28 moreover carries other cams such as 31, controlling by means of oscillating levers, such as 32, electric circuits which are not described and do not form part of the present invention.

The unwinding of the film and the operation of the mechanism are controlled by a resiliently suspended motor 33 and by suitable reducers 34 and 35.

Figure 2 shows the apparatus as a whole. On the vertical posts 36 and 36', arranged above the table 37 carrying the documents to be photographed, slides the carriage 38, carrying the photograph-taking device proper 39 with its magazine boxes juxtaposed in pairs (one supply box and one take up box for each film). The carriage 38, the weight of which is balanced by a counterweight 40 to which it is connected by cables 41—41', passing over the pulleys 42—42', carries, moreover, a support 43 on which is arranged at 44 an index card bearing the title to be photographed and lighted at the required instant by lamps 45 which are lit and put out by any suitable device. A milled knob 46, carried by the carriage, enables the image objectives 10—10' to be focused from a distance, by rotating, through a rod 47, the objective mounts; the rotation of this knob at the same time causes a number indicating the reduction ratio to appear on a drum 48, on the side of the support 43, such number being also visible next to the title at 49 where it is photographed with said title so as to appear on the index film. Near the title is also arranged a counter 50 which totalizes the number of views taken whilst an indicator 51 causes a number to appear next to the title, representing the number of the index film in a series bearing a same title, said counter being automatically reset to zero when the title is changed.

This indicator 51 is controlled by an electromagnet 81 (Figs. 6 and 7) acting on a lever 82 pivoting on the spindle 83 of the counter and actuating a pawl mechanism 84. This mechanism rotates a ratchet wheel 85 keyed to the spindle 83 and each tooth of which corresponds to a counter number. A second ratchet wheel 86 integral with the preceding one is urged backwards by a spring 87 and may be locked by a finger 88 integral with a lever 89. The ensemble 88—89 pivots about a spindle 90 and, due to its bent shape, holds the title index card 44. The latter can only be released by pressing on the lever 89, thereby releasing at the same time the ratchet wheel 86. Under the action of the spring 87, this ratchet wheel 86 moves backwards and the indicator is thus automatically reset to zero.

The carriage is stopped at the distance corresponding to the desired reduction ratio which is shown on a graduated ruler 52, by means of a locking device controlled by the handle 53, and the apparatus is started by means of a knob 54 disposed in any suitable place, for example on the table 37.

Lastly, in Fig. 2, there are shown at 55 a luminous signal indicating that the end of the index film has come in order to allow, if need be, the title to be changed, and at 56, the screws for fixing the camera to the carriage.

The magazine boxes are preferably of the type described in the French patent applied for by the applicant on December 15, 1944, for "Magazine box for cinematographic films." These magazines are moreover so designed as to be detachable in broad daylight without danger of spoiling the films they contain. This result is obtained by means of a circular knife both for cutting the film and for closing the film passage, safety means being provided for preventing cutting or unintended movements of the knife if the magazine is not in its place. As seen in Figure 3, the magazine box 57 is hooked on the apparatus 39 at 58. The film which comes out of the apparatus 39, passes through the slit 60, the edges 61 of which constitute a knife edge, of a cylinder 62 actuated by a lever 63 and enters the magazine box 57 through a passage made light proof, as usual, by velvet or the like (not represented). This cylinder outwardly carries two notches 64 and 65. In the notch 64 may enter a rod 66 pushed by a ball-locking device 67 subjected to the action of a spring 68 and which may enter a recess 69 in the magazine box 57. On the other hand, in the notch 65 may enter the tip 70 of a lever 71 pivotable mounted about a spindle 72. This lever is subjected on the one hand to the action of a sliding finger 73 and on the other hand to that of a retracting spring 74.

When the magazine is in position on the apparatus (position shown in continuous lines on the figure) the finger 73, which is urged inwardly by the box, bears on the lever 71 against the action of the spring 74, and the lever tip 70 is drawn away from the cylinder 62. The knife may then be freely rotated, by means of the lever 66. However, so long as the knife edge is in the open position, as shown, the ball-locking device 67 prevents the magazine from being detached. On the contrary, if the knife is in the closed position, the rod 66 rises into the notch 64, that is, after the cutting operation is completed, the rod 66 is released and unlocking of the box becomes possible (position shown in discontinuous lines). But at that moment, the finger 73 no longer bears on the lever 71; the tip 70 thereof can therefore fall into the notch 65 whereupon any movement of the knife is rendered impossible.

Figure 5 shows a device for preventing the apparatus from being set in operation in the event of a supply magazine not being in place on the side where coupling takes place. To this end, when one of the couplings 4₁ or 4₂ is in engagement, it establishes a contact 91. On the other hand, when the supply magazine 92 is in place, it establishes another contact 93. As can be seen in Fig. 5, in order that the motor 33 may operate, it is essential that a contact 91 and a contact 93 corresponding to a same film 1 or 1' be closed, that is, that a supply magazine be in position on the side where coupling is effected. In this case, the current, coming through the wire 94, flows through the wire 95, contact 91, wires 96 and 97, contact 93, wire 98 and the motor 33, and returns through the wire 99.

Other safety devices may be provided enabling the apparatus to be started only when the supply magazines contain a film. These devices are easily designed by means of suitable electric combinations.

Moreover, if the number of documents to be recorded does not permit of an index film being completed, the index film may be completed without recording any documents by the operation of a lever 59 (Fig. 2) which, by maintaining the shutters closed, causes the films to advance through the required amount to complete the index-film.

As previously stated, the actuation of the milled knob 46 enables the image objectives 10—10' to be focussed. This rotation at the same time automatically effects the correction of the distance between the objectives 10 and 10', which is variable according to the reduction ratio to be obtained. It is namely necessary that the optical center of each objective remains on the line center of document-center of image, whatever the distance is from the objectives to the documents.

This correction is obtained by means of the device shown in Fig. 4. The two objectives are secured to the objective-carrying plate 75 through the medium of slides 76—76' adapted to move away from one another, but urged towards one another by means of the spring 77. The distance between them is determined by a fixed cone 78 having a definite slope and integral with the apparatus, on the generatrices of which bear two stops 79—79', integral with the objective-carrying plate 75 which rise and sink under the action of the ring 80, rotating under the action of the knob 46, and, as a result, slide along the cone 78 by moving away or drawing together the two carriages 76 and 76'.

What I claim is:

1. Machine for the simultaneous photographic reproduction of documents on two cinematographic films comprising a table on which is disposed the document to be photographed, a carriage movable vertically above said table, a camera mounted on said carriage, means for moving two films parallel in relation to one another in said camera, a disconnecting device enabling either one of said films to be made use of if desired, two objectives on said camera for photographing on the two films the documents disposed on said table, two other objectives on said camera for photographing on said films an index-card carrying the title and disposed on the carriage, a rotating shutter for said two first objectives, a rotating shutter for said two second objectives, masking shutters operated by said disconnecting device, said masking shutters covering and uncovering the objectives of the film which is not being used, cams controlled by the means for moving the films producing at the required moments the opening and the closing of the shutters of said two first and said two second objectives, and auxiliary cams also controlled by the means for moving the film and rendering said first cams temporarily inoperative on at least one of said rotating shutters.

2. In a machine for the photographic reproduction of documents on a cinematographic film, a camera mechanism comprising an objective for photographing the documents, another objective for photographing an index-card carrying a title, a rotating shutter for said first objective, another rotating shutter for said second objective, a cam controlled by the means for moving the film, two levers actuated by said cam, each of said levers actuating each of said shutters, two auxiliary cams also controlled by the means for moving the film, each of said cams acting on each of said levers in order to render the same temporarily inoperative.

3. In a machine according to claim 1 wherein a knob is mounted in the camera for focussing said objectives and means are provided whereby said knob controls also the distance between said two objectives.

4. In a machine according to claim 1 wherein there is provided a knob mounted on the camera, a ring rotatably mounted on the camera and actuated by said knob, an objective carrying plate in said ring, slide bars fixed to said plate, slide blocks guided by said slide bars on which are mounted the objectives, a spring urging said slide blocks one towards the other, stops integral with said slide blocks and a fixed cone between said stops.

ANDRÉ VICTOR LÉON CLÉMENT DEBRIE.

REFERENCES CITED

The following references are of record in the file of this patent:

UNITED STATES PATENTS

| Number | Name | Date |
|---|---|---|
| 1,645,590 | Ernst | Oct. 18, 1927 |
| 1,730,930 | Fritts | Oct. 8, 1929 |
| 1,755,177 | Fruwirth | Apr. 22, 1930 |
| 1,793,837 | Caps | Feb. 24, 1931 |
| 1,801,458 | Satterlee | Apr. 21, 1931 |
| 1,904,097 | Steiner | Apr. 18, 1933 |
| 1,931,890 | Burns | Oct. 24, 1933 |
| 1,933,797 | Fritts | Nov. 7, 1933 |
| 1,940,187 | Salchon | Dec. 19, 1933 |
| 2,095,849 | Wittel | Oct. 12, 1937 |
| 2,125,388 | Monroe | Aug. 2, 1938 |
| 2,364,188 | Bryce | Dec. 5, 1944 |